(12) United States Patent
Koskelainen et al.

(10) Patent No.: US 7,418,509 B2
(45) Date of Patent: Aug. 26, 2008

(54) METHOD AND APPARATUS FOR A DISTRIBUTED SERVER TREE

(75) Inventors: Petri Koskelainen, New York, NY (US); Mikko Vainikainen, Tampere (FI)

(73) Assignee: Nokia Corporation, Espoo (FI)

( * ) Notice: Subject to any disclaimer, the term of this patent is extended or adjusted under 35 U.S.C. 154(b) by 642 days.

(21) Appl. No.: 09/986,936

(22) Filed: Nov. 13, 2001

(65) Prior Publication Data
US 2003/0093462 A1 May 15, 2003

(51) Int. Cl.
*G06F 15/16* (2006.01)
*G06F 9/22* (2006.01)

(52) U.S. Cl. .................. 709/229; 709/226; 718/105

(58) Field of Classification Search ......... 709/226–229, 709/217–219, 203; 718/105
See application file for complete search history.

(56) References Cited

U.S. PATENT DOCUMENTS

| | | | | |
|---|---|---|---|---|
| 5,774,660 A | | 6/1998 | Brendel et al. ......... | 395/200.31 |
| 5,805,820 A | | 9/1998 | Bellovin et al. ........ | 395/200.55 |
| 5,991,809 A | * | 11/1999 | Kriegsman .................. | 709/226 |
| 6,128,279 A | * | 10/2000 | O'Neil et al. ................ | 370/229 |
| 6,167,449 A | | 12/2000 | Arnold et al. ................ | 709/227 |
| 6,175,869 B1 | | 1/2001 | Ahuja et al. .................. | 709/226 |
| 6,185,598 B1 | | 2/2001 | Farber et al. ................. | 709/200 |
| 6,742,042 B1 | * | 5/2004 | Orton et al. .................. | 709/230 |
| 2001/0028654 A1 | | 10/2001 | Anjum et al. ................ | 370/401 |
| 2001/0039585 A1 | | 11/2001 | Primak et al. ................ | 709/228 |
| 2002/0126701 A1 | * | 9/2002 | Requena ....................... | 370/469 |

FOREIGN PATENT DOCUMENTS

| | | |
|---|---|---|
| WO | WO 00/14633 | 3/2000 |
| WO | WO 01/75652 A2 | 10/2001 |

OTHER PUBLICATIONS

Dynamic Load Balancing on Web-Server systems, Cardellini, V., et al., IEEE Internet Computing, May-Jun. 1999, p. 28-39.*
Towards a hierarchical scheduling for distributed WWW server clusters, Andersen, D. & McCune, T., High Performance Distributed Computing, Jul. 1998, p. 301-308.*

(Continued)

*Primary Examiner*—Zarni Maung
(74) *Attorney, Agent, or Firm*—Squire, Sanders & Dempsey L.L.P.

(57) ABSTRACT

A method and system for reducing server load. Requests are received for a service at a first server from a plurality of client devices. The first server decides to identify one or more other servers to provide the service to some of the plurality of client devices. An address is requested of one or more second servers from a server address management entity. A resource identifier is created at the second servers. Some of the plurality of client devices are redirected to get the service from the one or more second servers. A distributed server tree is formed. The first server provides the service to the second servers to be then provided to some of the plurality of client devices, therefore, reducing the load on the first server and providing more efficient service to the plurality of client devices. The servers may be Session Initiation Protocol (SIP) servers.

41 Claims, 9 Drawing Sheets

OTHER PUBLICATIONS

Shim, H.S., et al. An Example of Using Presence and Availability in an Enterprise for Spontaneous, Multiparty, Multimedia Communications, $2^{ND}$ IP-Telephony Workshop (IPTEL2001) Apr. 2001.*

IEEE 100, The Authorative Dictionary of IEEE Standards Terms, 7th ed., 2000, pp. 625 and 1115.*

"SIP: Session Initiation Protocol", Internet Engineering Task Force, Oct. 26, 2001, pp. 1-157.

Kempf, James, Sun Microsystems, and Rosenberg, Jonathan, Dynamicsoft, *"Finding a SIP Server with SLP"*, Session Initiation Protocol -Internet Draft, 1-13 pp., Feb. 8, 2000.

* cited by examiner

METHOD AND APPARATUS FOR A DISTRIBUTED SERVER TREE

BACKGROUND

1. Field of the Invention

This invention relates to servers and more specifically to creation of server trees for better efficiency and load distribution.

2. Discussion of the Related Art

There are numerous protocols that carry various forms of real-time multi-media session data such as voice, video, or text messages. A session is considered an exchange of data between an association of participants. Session Initiation Protocol (SIP) works in concert with these protocols by enabling Internet end points to discover one another and to agree on a characterization of a session they would like to share. SIP uses an infrastructure of network hosts (e.g., proxy servers) to which Internet end points (called user agents) can send registrations, invitations to sessions, and other requests.

SIP is an application-layer control protocol that can establish, modify, and terminate multimedia sessions (i.e., conferences) such as Internet telephony calls. SIP works independently of underlying transport protocols and without dependency on the type of session that is being established. SIP can also invite participants to already existing sessions. A SIP entity issuing an invitation for an already existing session does not necessarily have to be a member of the session to which it is inviting. Media can be added to (and removed from) an existing session. SIP transparently supports name mapping and redirection services, which supports personal mobility (i.e., users can maintain a single externally visible identifier (i.e., SIP Uniform Resource Identifier (URI)) regardless of their network location. This SIP URI is similar in form to an email address, typically containing a user name and a host name. The host name may be a domain name of the user's service provider, enterprise, retail provider, etc.

SIP is based on a Hypertext Transfer Protocol (HTTP) like request/response transaction model. Each transaction consists of a request that evokes a particular method or function on the server and at least one response.

SIP is becoming more and more popular. A lot of popular and large scale services will be provided with SIP, thus causing a lot of extra overhead to SIP application servers and networks. There are many push-like SIP non-call services that may generate tremendous amounts of overhead into SIP application servers and into the SIP network. These services are initiated by SIP SUBSCRIBE or SIP INVITE messages from a client.

The amount of SIP traffic becomes huge if a lot of users (especially from the same domain or ISP) subscribe or join the same SIP service. For example, an SIP event notification service, such as live text sport commentary, may have 10,000 users subscribed to the same service (in the same server). This means that the server has to send 10,000 SIP event notifications (or messages) all the time, and get as many responses. Further, the server may also have to retransmit some messages due to transmission problems. These 10,000 event notifications may possibly be sent over the same backbone links.

In another example, an SIP group service (e.g., chat groups) may be established, which may have a lot of users from the same domains. The users may be participating in the same domain or different groups in the same SIP server. In both these examples, where a lot of users join the same service or the data rate is higher than usual, the SIP server and its network interface becomes the bottleneck. Moreover, a problem also exists if there are a lot of less popular services, e.g., thousands of less popular events or small chat groups in the same SIP server.

A similar problem exists today with web services. For example, there may exist several web servers that provide live sport results. However, users have to press their web browser's "reload" button every few seconds if they want to follow the sport event live. This means that these web pages have to respond often with internal server error as network links are often congested causing packet drops (which makes TCP slower for the client).

One current solution to these problems is that one server has backup high-end servers nearby, each accessing the same database. However, this is an expensive solution (i.e., service provider must itself have these servers) and inefficient since it does not reduce the amount of network traffic.

Therefore, with one SIP server serving a lot of clients, several problems exist: a lot of extra overhead is created in the network; the SIP server load is large; the fairness to each client is not good since some clients receive a notification earlier than others since one server cannot send notifications to all clients simultaneously; and the process is more time consuming since the SIP server must send notifications/service to a large number of clients. Moreover, having clients perform manual or automatic refresh is inefficient since there may not be any new updated information for a long while or there may be a lot of new updating in a short amount of time that manual or automatic refresh misses.

SUMMARY OF THE INVENTION

The present invention is related to a method for reducing server load that includes: receiving requests for a service at a first server from a plurality of client devices; determining to identify at least one other server to provide the service to at least some of the plurality of client devices; requesting an address of at least one second server from a server address management entity; creating a resource identifier at the second server; and redirecting at least some of the plurality of client devices to get the service from the second server. The first server provides the service to the second server to be then provided to some of the plurality of client devices, therefore, reducing loading on the first server and providing more efficient service to the plurality of client devices.

The present invention also relates to a system for reducing server load that includes a first server and a tree of servers comprising at least one second server. The tree of servers provides a service received from the first server to a plurality of clients devices. Loading on the first server and each at least one second server is optimized to provide the service to the plurality of client devices more efficiently.

Moreover, the present invention is related to an article comprising a storage device with instructions stored therein. The instructions when executed cause a computing device to perform: receiving requests for a service from a plurality of client devices; determining to identify at least one server to provide the service to at least some of the plurality of client devices; requesting an address of at least one second server from a server address management entity; creating a resource identifier at the at least one second server; and redirecting at least some of the plurality of client devices to get the service from the at least one second server. The computing device provides the service to the at least one second server to be then provided to the some of the plurality of client devices, therefore, reducing the loading on the computing device and providing more efficient service to the plurality of client devices.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to method and apparatus for a distributed server tree where a main server identifies additional servers elsewhere and creates temporary resource identifiers when the main server has a large load or when there are large numbers of users in a particular area or domain that the main server is providing a service to. The main server transfers or redirects some users into these additional servers. The main server now has a much smaller number of users (mainly other servers). These other servers (branch servers) along with the main server now form a distributed server tree (DST) that reduces loading on the main server and provides more efficient service to the clients. Moreover, each branch server or local server is able to create additional servers also (adding onto the DST) to reduce loading and/or provide more efficient service to clients.

A DST may be optimized during the operation if necessary (e.g., a balanced tree) by transferring clients from one server to another or by chaining servers (e.g., main server→company server→department servers). Clients have a relationship with these additional branch servers (instead of the main server) and clients now get the data messages or service from these additional branch servers. The additional branch servers may be members (or subscribers) to the main server on behalf of a large number (e.g., thousands) of clients. This reduces dramatically overall traffic (especially in the main server's network) and the load in the branch application server.

To illustrate the present invention Session Initiation Protocol (SIP) servers will be used, however, the present invention is not limited to the use of SIP servers as any type of server may be used and still be within the spirit and scope of the present invention. The present invention applies existing SIP standards and may be implemented only into servers. According to the present invention, clients don't have to understand the DST function since clients are controlled using standard SIP redirection or transfer mechanisms. The main server makes the decision whether to create a distributed server tree. The additional servers may be identified and manually configured in the main server, or found dynamically using known Domain Naming System (DNS) and/or Service Location Protocol (SLP) mechanisms.

Any SIP application server may become a main server or a branch server. The main server may have knowledge all the time of some friendly and pre-configured branch servers elsewhere, (e.g., at different Internet service providers (ISPs)) connected so they can be brought into use immediately. If a main server wants to optimize a distributed serve tree and have a branch server in certain domains (e.g., because a lot of users are from that domain), then the main server may ask the address of the DST-enabled SIP application server in that domain using Service Location Protocol. The local SLP server must have the knowledge of the local SIP application server. If the main server load increases, or a lot of users are from one particular domain, the main server creates add hoc resource identifiers (e.g., groups, URLs, etc.) into the branch servers using SIP INVITE address to a new SIP URL. Now, the main server knows that the branch server has a SIP URL reserved for it and the main server may send messages or notifications to the branch server. A main server may then transfer some existing clients ("REFER" may also be used so that a branch server makes the "SUBSCRIBE" in the case of event notification service) or redirect some clients to the branch server using standard SIP mechanisms (e.g., 30× "MOVED" response or third party call control). The main server has now created a distributed server tree with one or more branch servers and a lot of users having a SIP relationship with these branch servers. If an event happens or a message is sent to a group, the main server sends the message to its members (i.e., to branch servers and possible direct clients). This is a relatively light operation for the main server from a network and CPU point of view. Thus, methods and apparatus according to the present invention have huge scaling capability since there may be several first hop branch servers and then third and fourth etc. hop servers.

Figure 1:
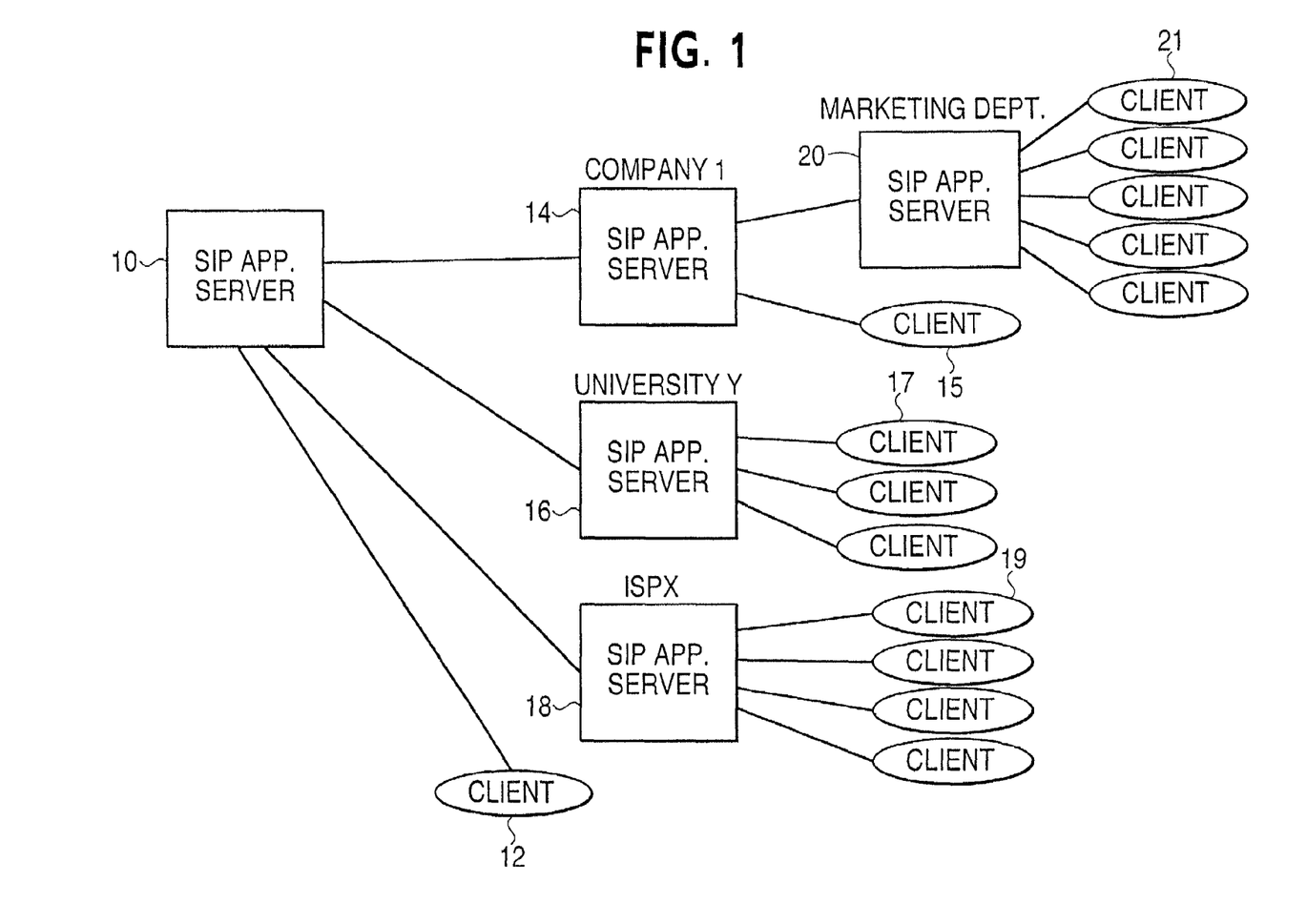
FIG. 1 is a block diagram of a distributed server tree according to an example embodiment of the present invention.

FIG. 1 shows a block diagram of a distributed server tree according to an example embodiment of the present invention. In this example distributed server tree, main SIP application server 10 provides service and messages to one or more clients 12 and branch SIP application servers 14, 16 and 18. Each branch server may be located in a different area or under a different domain or Internet service provider. For example, SIP application server 14 may be at a company's location (company1), SIP application server 16 at a university (UniversityY), and SIP application server 18 in a particular ISP (ISPX). SIP application server 14 may provide service to one or more clients 15, SIP application server 16 may provide service to one or more clients 17, and SIP application server 18 may provide service to one or more clients 19. Moreover, application server 14 may also provide service to one or more other branch SIP application servers 20 that are part of or located in the same area as company1. SIP application server 20 may, for example, represent the marketing department of company 1 and service its own set of clients 21 (e.g., marketing representatives).

Therefore, in a distributed server tree according to the present invention, the load on each SIP application server is reduced, there is less traffic over each server link, there is faster response time for clients (i.e., they get notification faster), and the system is fairer since all clients may receive service (e.g., notifications) at approximately the same time because there are not as many users/clients directly serviced by main SIP application server 10. Moreover, each branch SIP application server 14, 16, 18, 20 may decide, based on loading or location of clients, to create other branch SIP application servers.

Figure 2:
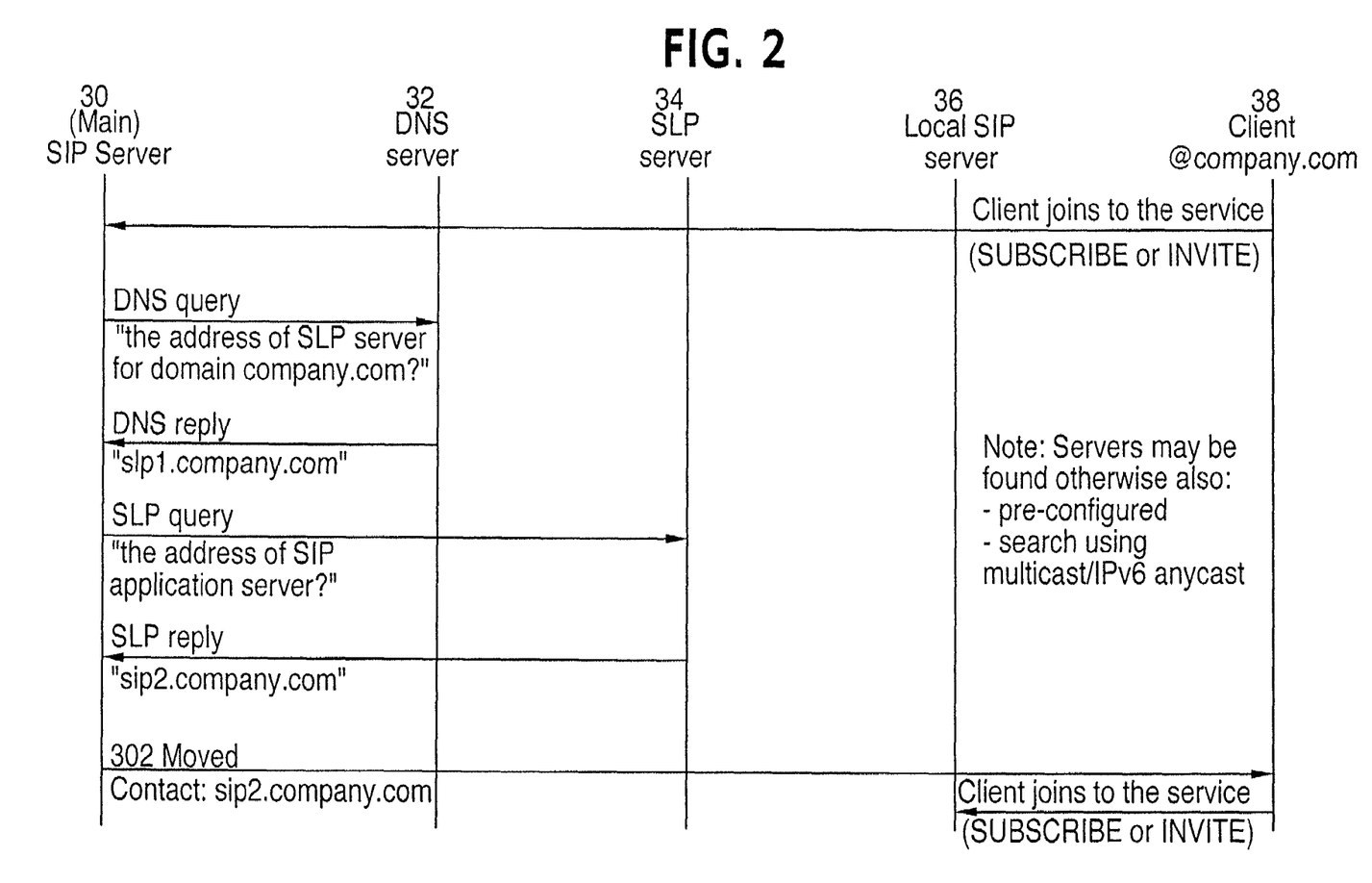
FIG. 2 is a diagram of signaling to identify branch servers according to an example embodiment of the present invention.

FIG. 2 shows a diagram of signaling to identify branch servers according to an example embodiment of the present invention. This signaling diagram shows the signaling between a main SIP server, a DNS server, a SLP server, a local/branch SIP server, and a client. The client may be located or have a URI at a domain company.com. The client joins a service provided by the main SIP server (using an SIP SUBSCRIBE or SIP INVITE message). The main SIP server sends a DNS query to the DNS server requesting the address of an SLP server for the domain company.com. The DNS server sends a reply to the main SIP server that includes the address of the SLP server. The main server then sends a SLP query to the SLP server requesting the address of an SIP application server. The SLP server replies by sending the address of the SIP application server to the main SIP server. The main SIP server then sends a 302 Moved message to the client redirecting the client to use the local SIP server. The client then joins the service from the local SIP server using a SIP SUBSCRIBE or SIP INVITE message. Although in this embodiment, the main SIP server uses an SLP server through a DNS server, the main SIP server may also contact an SLP server directly without going through a DNS server and still be within the spirit and scope of the present invention. Moreover, the present invention is not limited to using DNS and/or SLP. Other methods, such as multicast search or pre-defined servers (e.g., via service level agreements between ISPs), may be used and still be within the spirit and scope of the present invention.

Figure 3:
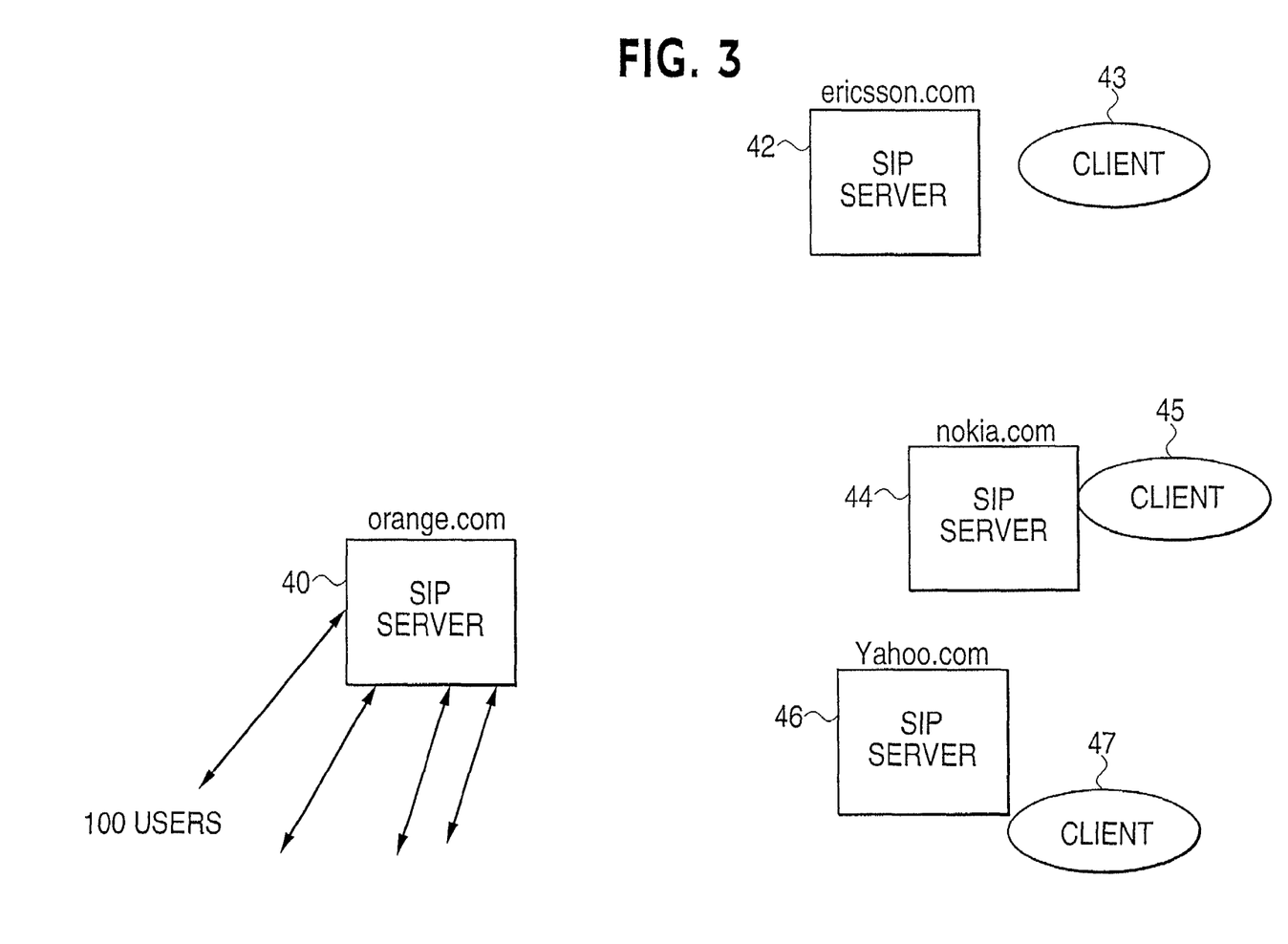
FIG. 3 is a diagram of SIP servers before a DST has been created according to an example embodiment of the present invention.

FIG. 3 shows a diagram of SIP servers before a DST has been created according to an example embodiment of the present invention. A main SIP server 40 may provide service to a large number of client devices at a domain orange.com. Other SIP servers, SIP server 42 at domain ericsson.com, SIP server 44 at domain nokia.com, and SIP server 46 at domain yahoo.com, may each service their own set of clients 43, 45 and 47, respectively. Note that in this example embodiment, SIP server 40 has a large number of users that it may send SIP event services to, for example, a sporting event update.

Figure 4:
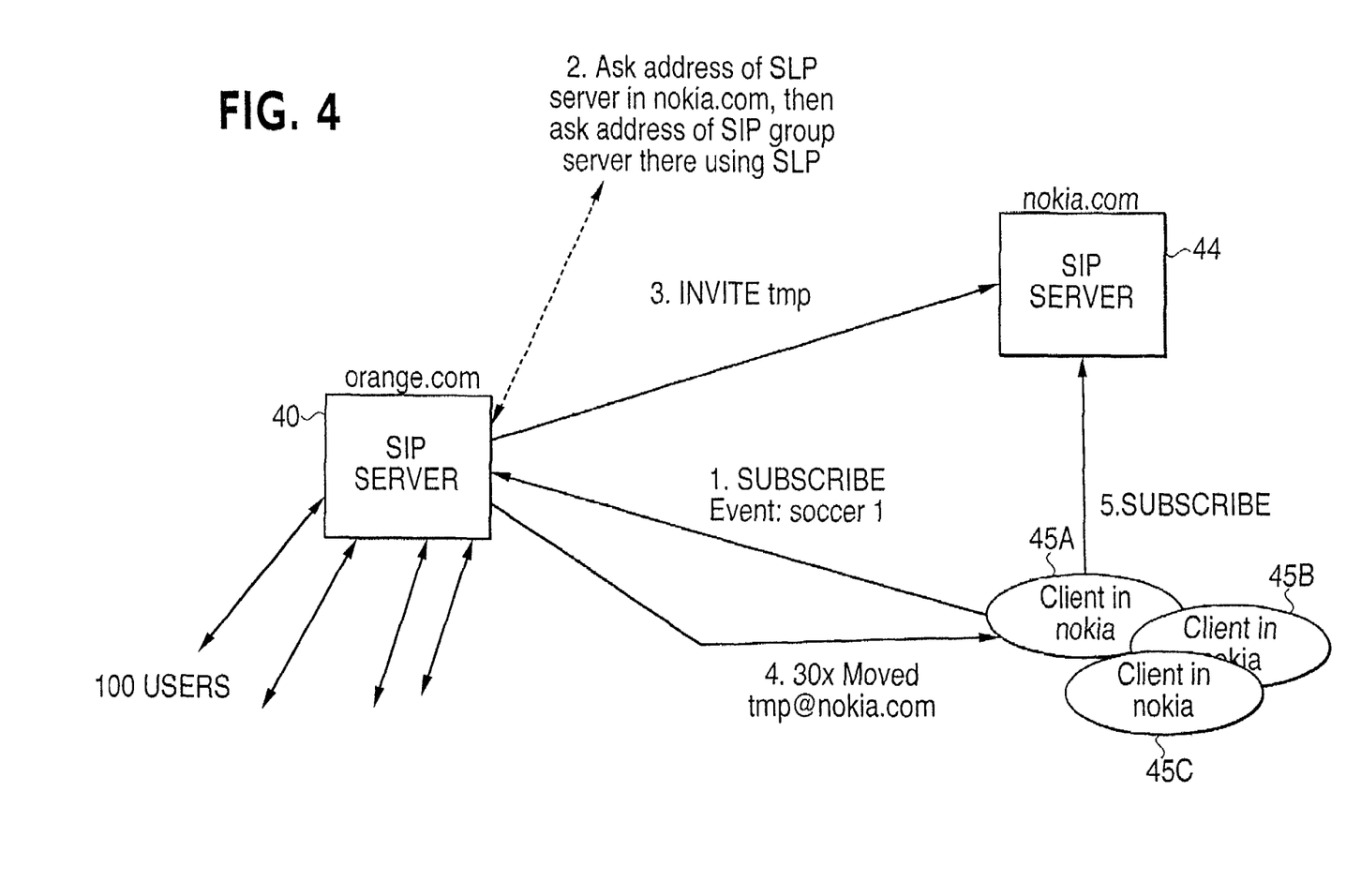
FIG. 4 is a diagram of initial creation of a DST according to an example embodiment of the present invention.

FIG. 4 shows a diagram of initial creation of a DST according to an example embodiment of the present invention. SIP server 40 (at domain orange.com) because of its large load due to the number of clients/users, or due to the location of some of the clients/users, decides to create branch servers to help handle and service some of the users. SIP server 40 may then find out possible other servers via DNS or SLP or otherwise. Once identified and once the SIP server 40 obtains the address of the SIP group server in the particular domain(s), SIP server 40 creates new Universal Resource Locators (URLs) at these servers in the domains (e.g., SIP server 44 at nokia.com). SIP server 40 then redirects one or more of the client/users to SIP server 44 at domain nokia.com.

Figure 5:
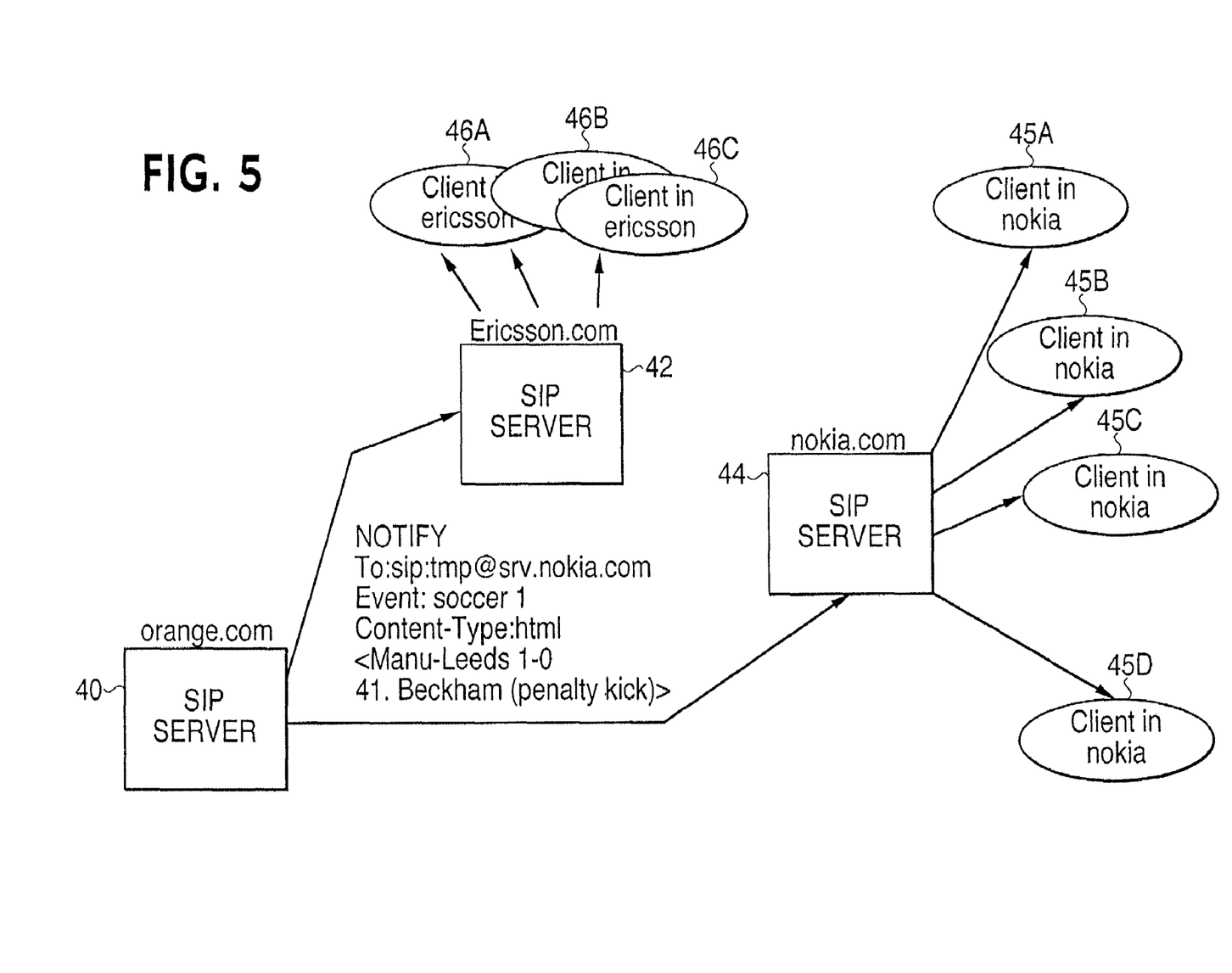
FIG. 5 is a diagram of a created DST according to an example embodiment of the present invention.

FIG. 5 shows a diagram of a created DST according to an example embodiment of the present invention. Now a small distributed server tree, that includes SIP server 40 at orange.com and SIP server 44 at Nokia.com, has clients 45A-45D that have been redirected to SIP server 44. SIP server 40 may also create additional branch servers, e.g., SIP server 42, and redirect clients to SIP 42, i.e., clients 46A-46C. Main SIP server 40 controls the DST and sends notifications to SIP servers 42 and 44 to be retransmitted to clients 45A-45D and 46A-46C. A NOTIFY message may be used for this purpose and may include a "To" field, an "Event" field, a "Content-Type" field, and other information (e.g., the update information).

As discussed previously, a main SIP server may find other servers dynamically using DNS and/or SLP. Moreover, a main SIP server may also have access to a list of known servers that may be used if needed. According to the present invention, any SIP application server may be a main SIP server and initiate the creation of a distributed server tree. In addition, the present invention may be applied to event notification (e.g., notifying clients of sporting event updates, current news item updates, financial information updates such as stocks, etc.), or applied to group communications (e.g., group chat rooms, conference calls, etc.). In the latter application (group communications) an SIP SUBSCRIBE and SIP NOTIFY request may not be necessary, only SIP INVITE messages.

Figure 6:
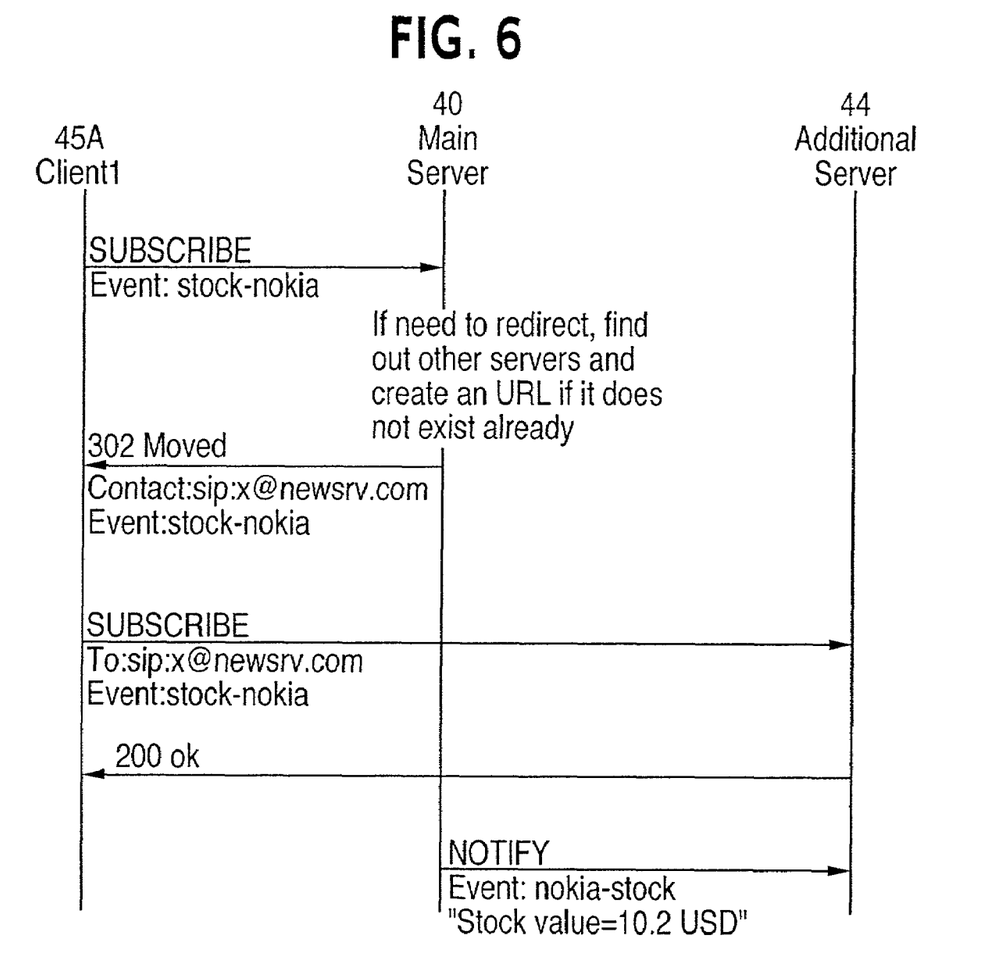
FIG. 6 is a diagram of event/notification DST signaling according to an example embodiment of the present invention.

FIG. 6 shows a diagram of event/notification DST signaling according to an example embodiment of the present invention. A client, 45A, subscribes to a notification service or event with main server 40. Main server 40 decides to redirect this client and finds an additional server 44. Main server 40 creates a URL at additional server 44 if one does not already exist. Main server 40 then sends a SIP 302 Moved message to client 45A. This instructs client 45A to contact additional server 44 for the event subscribed to. Client 45A then sends a SUBSCRIBE message to additional server 44. Additional server 44 responds with an SIP 200 okay message. When new information becomes available related to the event that client 45A has subscribed to, main server 40 sends a NOTIFY message containing the updated information to additional server 44 who may then forward it on to client 45A.

Figure 7:
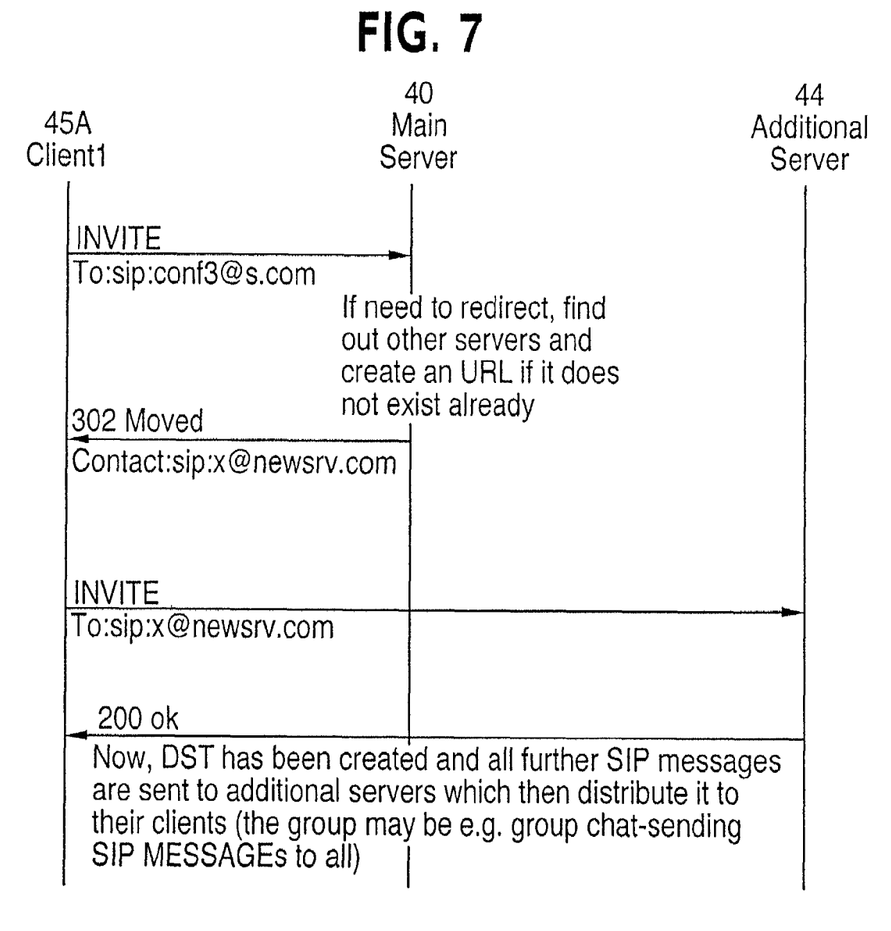
FIG. 7 is a diagram of group communication DST signaling according to an example embodiment of the present invention.

FIG. 7 shows a diagram of group communication DST signaling according to an example embodiment of the present invention. A client 45A sends a SIP INVITE message to main server 40 to participate in a group communication. Main server 40 decides to move client 45A and sends a 302 Moved message to client 45A. Client 45A then sends an INVITE message to additional server 44. Additional server 44 responds with a SIP 200 ok message. Now a distributed server tree has been created and all further SIP messages are sent from main server 40 to additional server 44 and then distributed to the clients. The group communications may consist of a group chat whereby SIP messages may be sent to all clients in the group.

Figure 8:
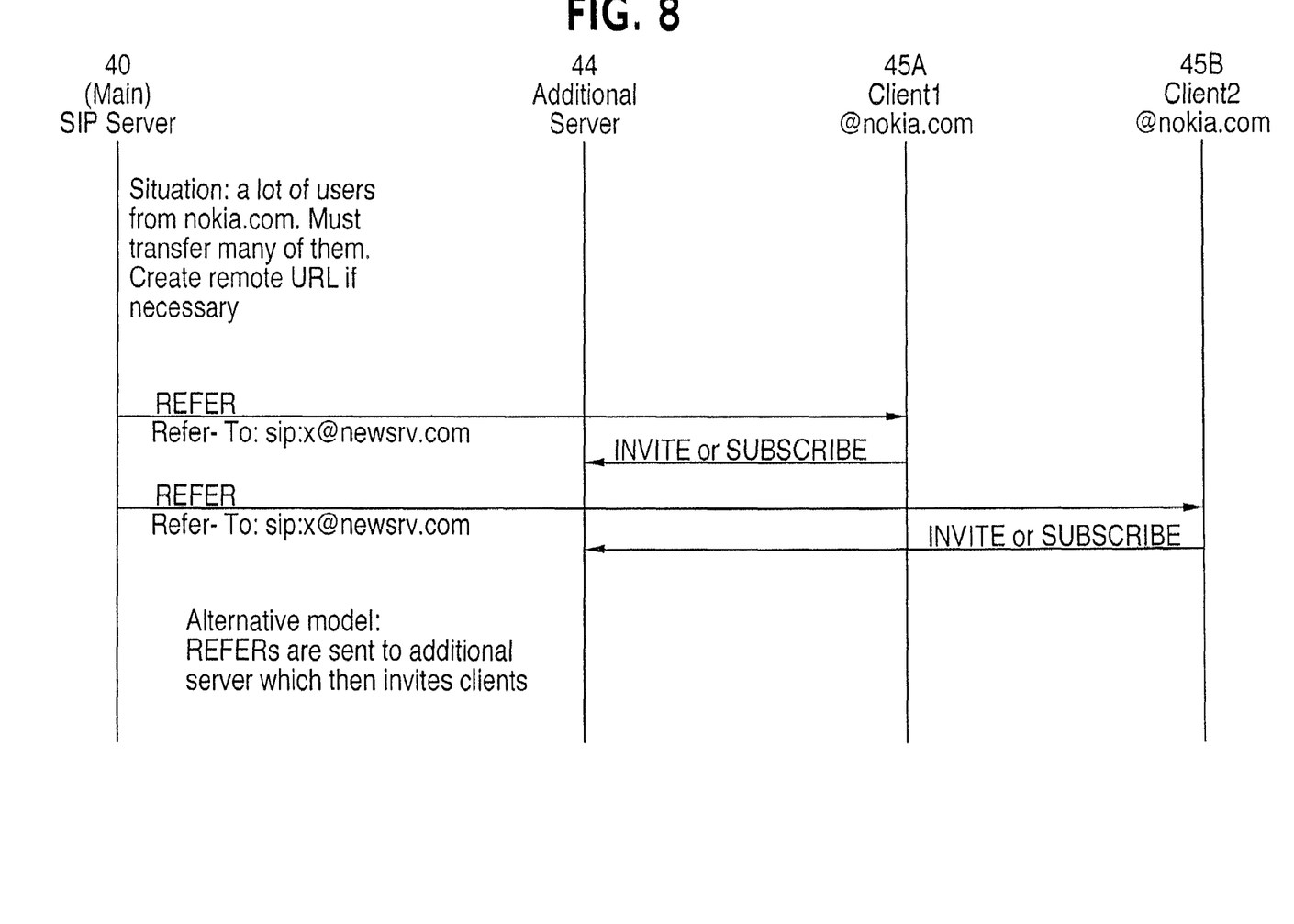
FIG. 8 is a diagram of signaling for SIP transfers according to an example embodiment of the present invention.

FIG. 8 shows a diagram of signaling for SIP transfers according to an example embodiment of the present invention. Main server 40 currently services a lot of users from a particular domain (e.g., nokia.com) and decides to transfer many of them. Main server 40 may send a SIP REFER message to client 45A in domain nokia.com. Client 45A may then send a SIP INVITE or SIP SUBSCRIBE message to additional server 44. Main SIP server 40 may also send a SIP REFER message to client 45B in domain nokia.com. Client 45B then may send an INVITE or SUBSCRIBE message to additional server 44. SIP REFER messages provide the URL of additional server 44 to clients 45A and 45B. In another example embodiment, the main server 40 may send SIP REFER messages to additional servers that then INVITE the clients in domain nokia.com.

Figure 9:
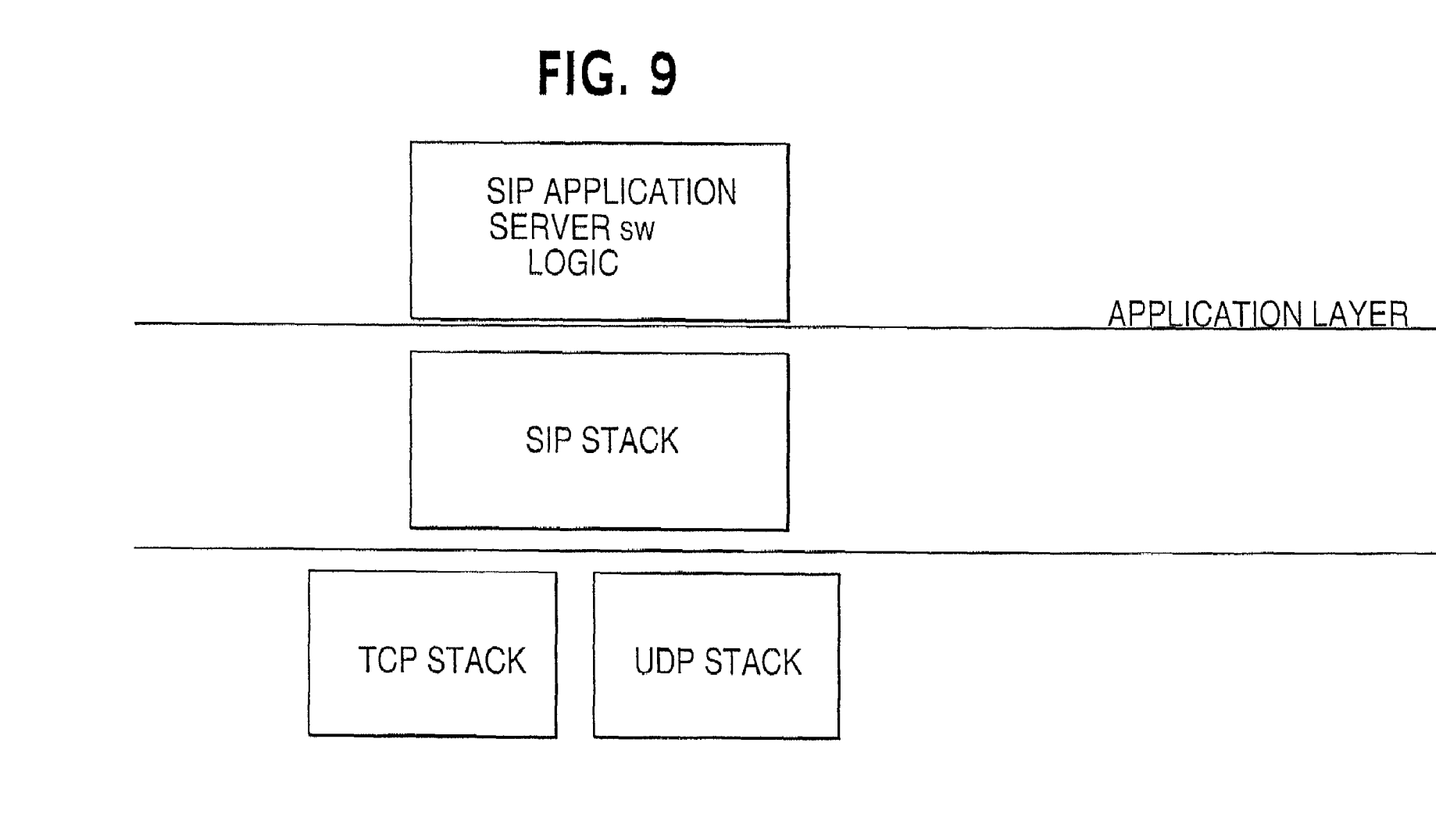
FIG. 9 is a diagram of a software architecture in a SIP server according to an example embodiment of the present invention.

FIG. 9 shows a software architecture in a SIP server according to an example embodiment of the present invention. According to the present invention, the DST functionality may reside in main SIP servers and in local/branch servers. This functionality may be in the form of software, specifically SIP application server software, at the application layer of the software architecture at an SIP server. The application layer resides above the SIP stack that resides above the Transmission Control Protocol (TCP) stack and User Datagram Protocol (UDP) stack at the SIP server. Therefore, according to the present invention, no modifications or changes need to be made to the SIP stack at a SIP server. Moreover, no modifications or changes need to be incorporated by client devices. According to the present invention, SIP application server software that resides at SIP servers provides the functionality for the SIP server to create URLs on the SIP server as well as the decision making to determine at the SIP server whether a DST may need to be established (e.g., based on loading and/or location of clients).

Although the present invention has been discussed and illustrated using SIP, the present invention is not limited to the use of SIP. Any other types of servers and systems may also apply the present invention for creation of a distributed server tree and reduction of server loading. Moreover, although URLs have been used to illustrate the present invention, the present invention is not limited to the use of URLs, and any other type of identifier may used and still be within the spirit and scope of the present invention (e.g., group identifiers, resource locators, addresses, etc.).

Methods and apparatus according to the present invention are advantageous in that extra network traffic is reduced in originating network, intermediate backbone, and in terminating network. Moreover, loading on the main server is also reduced. In addition, notification to clients is much faster due to the reduction in main server bottleneck possibilities. Further, notifications to clients are fairer since each client receives notification approximately at the same time.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method, comprising:
   receiving requests for a service at a first server from a plurality of client devices;
   determining to identify at least one other server to provide the service to at least one of the plurality of client devices on the basis of determining that a plurality of client devices are located in a particular location;
   determining that some of the plurality of client devices fulfill load balancing criteria for providing the service more efficiently via at least one second server;
   creating a resource identifier for the at least one second server; and
   redirecting at least some of the plurality of client devices to get the service from the at least one second server, wherein the first server redirects the request for the service in a single message to each of the at least one second server, each of said at least one second server providing service for the plurality of client devices redirected to the at least one second server, therefore, reducing the load on the first server.

2. The method according to claim 1, further comprising receiving the requests for the service at the first server from web browsers at the plurality of client devices.

3. The method according to claim 1, further comprising determining to identify the at least one other server to provide the service to at least some of the client devices based on current load of the first server.

4. The method according to claim 1, further comprising determining to identify the at least one other server to provide the service to at least some of the client devices based on a location of the some of the plurality of client devices.

5. The method according to claim 4, further comprising determining to identify the at least one other server to provide the service to at least some of the client devices based on a domain of the some of the plurality of client devices.

6. The method according to claim 1, further comprising requesting the address of the at least one second server from a Domain Naming System server.

7. The method according to claim 1, further comprising requesting the address of the at least one second server from a Service Location Protocol server.

8. The method according to claim 1, wherein the first server and the at least one second server are Session Initiation Protocol servers.

9. The method according to claim 8, further comprising receiving the requests for the service at the first SIP server by receiving one of a SIP SUBSCRIBE message and a SIP INVITE message from the plurality of client devices.

10. The method according to claim 1, further comprising requesting an address of a Service Location Protocol server from a Domain Naming System server, and requesting the address of the at least one second server from the Service Location Protocol server.

11. The method according to claim 1, further comprising receiving requests comprising subscriptions to a notification service at the first server from the plurality of client devices.

12. The method according to claim 11, further comprising further comprising receiving subscriptions to one of a sports event notification service, a news event notification service, and a financial event notification service at the first server from the plurality of client devices.

13. The method according to claim 1, further comprising receiving requests comprising invitations to a group communications at the first server from the plurality of client devices.

14. The method according to claim 13, further comprising receiving invitations to one of a group conference call and a chat group at the first server from the plurality of client devices.

15. The method according to claim 1, further comprising the at least one second server:
  determining to identify at least one other server to provide the service to the at least some of the plurality of client devices;
  requesting an address of at least one third server from the server address management entity;
  creating a resource identifier at the at least one third server; and
  redirecting at least some of the plurality of client devices to get the service from the at least one third server,
  wherein the load on the at least one second server is reduced.

16. The method according to claim 1, further comprising identifying the at least one other server to provide the service to at least some of the plurality of client devices from a list of known servers.

17. The method according to claim 1, further comprising optimizing the service to the at least some of the plurality of client devices by balancing the load among the at least one second server.

18. The method according to claim 1, further comprising optimizing the service to the at least some of the plurality of client devices by redirecting some of the at least some of the plurality of client devices from the at least one second server to get the service from at least one third server.

19. The method according to claim 1, wherein the resource identifier comprises one of a Universal Resource Locator and a group identifier.

20. The method according to claim 1, wherein the particular location comprises a domain where clients are located.

21. A computer program embodied on a computer-readable-medium, when executed the computer program causing a computing device to:
  receive requests for a service from a plurality of client devices;
  determine to identify at least one other server to provide the service to at least one of the plurality of client devices on the basis of determining that a plurality of client devices are located in a particular location;
  determine that some of the plurality of the client devices fulfill load balancing criteria for providing the service more efficiently via at least one second server;
  create a resource identifier for the at least one second server; and
  redirect at least some of the plurality of client devices to get the service from the at least one second sever, wherein the computing device redirects the request for the service in a single message to each of the at least one second server, each of said at least one second server providing service to some of the plurality of client devices redirected to the at least one second server, therefore, reducing the load on the computing device.

22. The computer program according to claim 21, further causing the computing device to determine to identify the at least one other server to provide the service to at least some of the client devices based on current load of the computing device.

23. The computer program according to claim 21, further causing the computing device to determine to identify the at least one other server to provide the service to at least some of the client devices based on a location of the some of the plurality of client devices.

24. The computer program according to claim 23, further causing the computing device to determine to identify the at least one other server to provide the service to at least some of the client devices based on a domain of the some of the plurality of client devices.

25. The computer program according to claim 21, further causing the computing device to request the address of the at least one second server from a Domain Naming System server.

26. The computer program according to claim 21, further causing the computing device to request the address of the at least one second server from a Service Location Protocol server.

27. The computer program according to claim 21, wherein the computing device and the at least one second server comprise Session Initiation Protocol servers.

28. The computer program according to claim 27, further causing the computing device to receive the requests for the service at the computing device by receiving one of a SIP SUBSCRIBE message and a SIP INVITE message from the plurality of client devices.

29. The computer program according to claim 21, further causing the computing device to request an address of a Service Location Protocol server from a Domain Naming System (DNS) server, and requesting the address of the at least one second server from the Service Location Protocol server.

30. The computer program according to claim 21, wherein the resource identifier comprises one of a Universal Resource Locator and a group identifier.

31. The computer program according to claim 21, wherein the particular location comprises a domain where clients are located.

32. An apparatus comprising:
  a receiver configured to receive requests for a service from a plurality of client devices;
  a identifier configured to identify at least one other server to provide the service to at least one of the plurality of client device;
  a determiner configured to determine that some of the plurality of the client devices fulfill load balancing criteria for providing the service more efficiently via at least one second server;
  a creator configured to create a resource identifier for the at least one second server; and
  a redirector configured to redirect at least some of the plurality of client devices to get the service from the at least one second sever, wherein the server redirects the request for the service in a single message to each of the at least one second server, each of said at least one second server providing service to some of the plurality of client devices redirected to the at least one second server, therefore, reducing the load on the server.

33. The apparatus according to claim 32, wherein the identifier is further configured to identify the at least one other server to provide the service to at least some of the client devices based on current load of the server.

34. The apparatus according to claim 32, wherein the identifier is further configured to identify the at least one other server to provide the service to at least some of the client devices based on a location of the some of the plurality of client devices on the basis of determining that a plurality of client devices are located in a particular location.

35. The apparatus according to claim 34, wherein the particular location comprises a domain where clients are located.

36. The apparatus according to claim 32, wherein the identifier is further configured to to identify the at least one other server to provide the service to at least some of the client devices based on a domain of the some of the plurality of client devices.

37. The apparatus according to claim 32, further comprising a requester configured to request the address of the at least one second server from a Domain Naming System server.

38. The apparatus according to claim 32, further comprising a requester configured to request the address of the at least one second server from a Service Location Protocol server.

39. The apparatus according to claim 32, wherein the server and the at least one second server comprise Session Initiation Protocol servers.

40. An apparatus, comprising:
a receiver configured to receive requests for a service at a first server from a plurality of client devices;
a first determiner configured to determine to identify at least one other server to provide the service to at least one some of the plurality of client device on the basis of determining that a plurality of client devices are located in a particular location;
a second determiner configured to determine that some of the plurality of client devices fulfill load balancing criteria for providing the service more efficiently via at least one second server;
a creator configured to create a resource identifier for the at least one second server; and
a redirector configured to redirect at least some of the plurality of client devices to get the service from the at least one second server, wherein the first server redirects the request for the service in a single message to each of the at least one second server, each of said at least one second server providing service for the plurality of client devices redirected to the at least one second server, therefore, reducing the load on the first server.

41. An apparatus, comprising:
receiving means for receiving requests for a service at a first server from a plurality of client devices;
determining means for determining to identify at least one other server to provide the service to at least one of the plurality of client device on the basis of determining that a plurality of client devices are located in a particular location;
determining means for determining that some of the plurality of client devices fulfill load balancing criteria for providing the service more efficiently via at least one second server;
creating means for creating a resource identifier for the at least one second server; and
redirecting means for redirecting at least some of the plurality of client devices to get the service from the at least one second server, wherein the first server redirects the request for the service in a single message to each of the at least one second server, each of said at least one second server providing service for the plurality of client devices redirected to the at least one second server, therefore, reducing the load on the first server.

* * * * *